(12) United States Patent
Coffin

(10) Patent No.: US 8,702,538 B1
(45) Date of Patent: Apr. 22, 2014

(54) TARGET RECOGNITION SYSTEM

(71) Applicant: Intellitrain Sports, LLC, Miamisburg, OH (US)

(72) Inventor: John T. Coffin, Franklin, OH (US)

(73) Assignee: Intellitrain Sports, LLC, Miamisburg, OH (US)

( * ) Notice: Subject to any disclaimer, the term of this patent is extended or adjusted under 35 U.S.C. 154(b) by 0 days.

(21) Appl. No.: 13/781,818

(22) Filed: Mar. 1, 2013

(51) Int. Cl.
*A63F 9/24* (2006.01)

(52) U.S. Cl.
USPC .............................................. 473/422; 463/51

(58) Field of Classification Search
USPC .................. 473/422, 476; 463/29, 42, 51, 52
See application file for complete search history.

(56) References Cited

U.S. PATENT DOCUMENTS

| | | | |
|---|---|---|---|
| 4,898,391 A * | 2/1990 | Kelly et al. ........................ 463/5 |
| 4,974,833 A | 12/1990 | Hartman et al. | |
| 5,904,621 A * | 5/1999 | Small et al. ....................... 463/52 |
| 5,984,788 A * | 11/1999 | Lebensfeld et al. ............. 463/51 |
| 6,302,796 B1 * | 10/2001 | Lebensfeld et al. ............. 463/51 |
| 7,338,375 B1 * | 3/2008 | Small ................................ 463/39 |
| 7,846,028 B2 * | 12/2010 | Small et al. ...................... 463/51 |
| 8,366,525 B2 * | 2/2013 | Jensen ............................... 463/5 |
| 8,552,847 B1 * | 10/2013 | Hill ............................. 340/407.1 |
| 2002/0111201 A1 * | 8/2002 | Lang ................................. 463/2 |
| 2005/0043102 A1 * | 2/2005 | Anderson et al. ............... 463/49 |
| 2006/0287114 A1 * | 12/2006 | Luong ............................. 463/51 |
| 2007/0167224 A1 * | 7/2007 | Sprogis ........................... 463/29 |
| 2007/0213126 A1 | 9/2007 | Deutsch et al. | |
| 2009/0005196 A1 * | 1/2009 | Kessler et al. ................ 473/476 |
| 2011/0300944 A1 * | 12/2011 | Raynal ............................ 463/42 |

FOREIGN PATENT DOCUMENTS

WO 00/18479 4/2000

* cited by examiner

*Primary Examiner* — William Brewster
*Assistant Examiner* — Jason Skaarup
(74) *Attorney, Agent, or Firm* — Walters & Wasylyna LLC

(57) ABSTRACT

A target recognition system may include a controller configured to transmit an actuation signal and a plurality of designators in wireless communication with the controller, each of the designators may include a signaling device, and wherein the actuation signal may be selectably associated with a selected designator of the plurality of designators to actuate the signaling device.

20 Claims, 9 Drawing Sheets

TARGET RECOGNITION SYSTEM

FIELD

The present disclosure is generally related to training aids and, more particularly, to a target recognition system and method that improves target recognition, decision-making and reaction time, particularly for sports and athletic training.

BACKGROUND

The preparation of athletes for various competitive sporting events can involve a variety of training regimens. Each training regimen is typically designed to target one or more areas of athletic performance. For example, speed, agility, strength, coordination, accuracy, conditioning, and endurance can each be improved through specific workout programs. Typically, such workout programs can be performed on an individual basis.

However, other areas of athletic performance are just as important to the success of the athlete on the field of play. For example, the ability to process information quickly, make the right decision, and react to that decision each have a direct impact on the outcome of a sporting event and the success of the athlete. These skills are of particular importance in team sports, such as football, soccer, basketball, volleyball, rugby and hockey, where an offensive player is regularly required to avoid defenders and pass a ball or puck to another offensive player in order to traverse the field of play.

Unfortunately, improving upon such skills typically requires multiple offensive and defensive participants, such as an organized team practice. Thus, without a sufficient number of participants, an athlete may be unable to adequately develop the decision-making and reaction time skill set. Furthermore, team practices can limit the time available to an individual athlete to devote specifically to improving such skills.

Accordingly, those skilled in the art continue with research and development efforts in the field of improving target recognition, decision-making and reaction time, particularly for sports and athletic training.

SUMMARY

In one embodiment, the disclosed target recognition system may include a controller configured to transmit an actuation signal and a plurality of designators in wireless communication with the controller, each of the designators including a signaling device, wherein the actuation signal is selectably associated with a selected designator of the plurality of designators to actuate the signaling device.

In another embodiment, disclosed is a method of target acquisition training, the method may include the steps of: (1) providing a controller configured to transmit an actuation signal, (2) providing a plurality of designators in wireless communication with the controller, each of the plurality of designators including a signaling device, (3) equipping each of a plurality of targets with one of the plurality of designators, (4) transmitting the actuation signal from the controller, the actuation signal being selectably associated with a selected designator of the plurality of designators, and actuating the signaling device of the selected designator in response to the actuation signal to designate a target.

Other embodiments of the disclosed target recognition system will become apparent from the following detailed description, the accompanying drawings and the appended claims.

DETAILED DESCRIPTION

Figure 1:
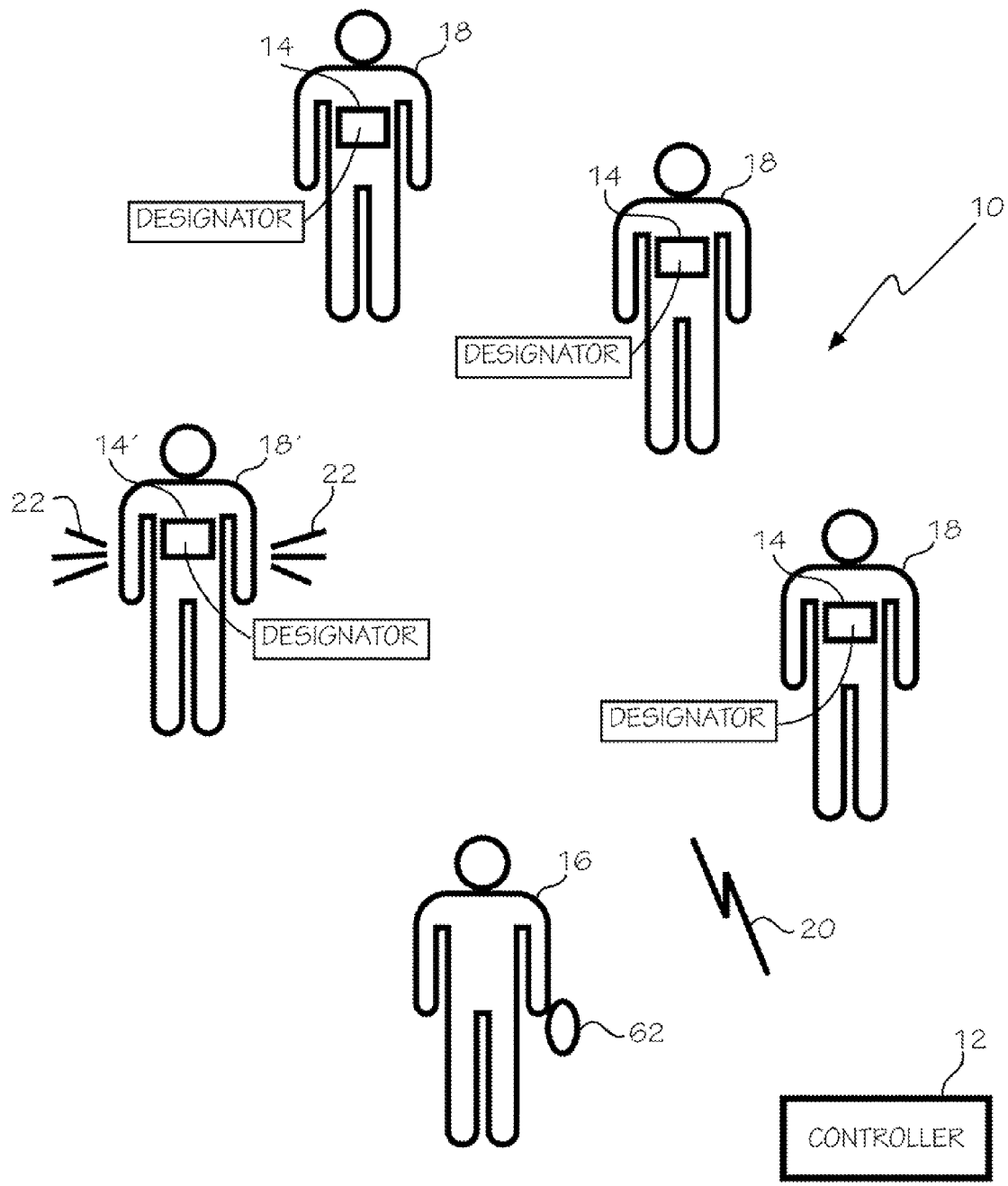
FIG. 1 is a schematic illustration of the disclosed target recognition system.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed target recognition system, generally designated 10, may include at least one controller 12 and a plurality of designators 14. The system 10 may be used in a variety of training applications to improve upon a trainee's ability to quickly recognize a target, make an actionable decision related to the target, and react to the decision. For example, as illustrated, the system 10 may simulate game conditions of a multi-player sport (e.g., football, soccer, basketball, hockey, volleyball, or rugby) that involves the passing of an object 62 (e.g., ball or puck) from one offensive player to another offensive player (e.g., to traverse a field of play 64 (FIGS. 3-5)). The system 10 may also be utilized to train a similar skill set in other applications, such as military training, security training, police training, and fire and rescue training.

The system 10 may be utilized with at least one trainee 16 and a plurality of targets 18. It is also contemplated that the trainee 16 may be a target 18 (e.g., the trainees 16 and the targets 18 may be one and the same). For example, in a sport training application, an offensive player in possession of the object 62 may represent the trainee 16. The trainee 16 may be positioned to pass the object 62 to one of a plurality of other offensive players that may represent a plurality of targets 18. Each target 18 may be equipped with one of the plurality of designators 14. The controller 12 may transmit, broadcast or otherwise send an actuation signal 20 to a selected designator 14' mounted to, carried on, or worn by a corresponding designated target 18'. Upon reception of the actuation signal 20, the specified designator 18' may designate, or identify, the designated target 18' with a target identifier 22. The trainee 16 may then recognize the designated target 18' from the plurality of targets 18, make a decision based on recognition of the designated target 18' within an allotted period of time, and react to the decision, for example by passing the object 62 to the designated target 18'.

It can be appreciated that the positions of the trainee 16 and the targets 18 on a practice area (e.g., field, court or rink), the timing of transmission of the actuation signal 20, and the duration of the time between actuation signals 20 may vary throughout a training session. The designators 14 may be placed in a wide variety of configurations limited only by the range of the wireless protocol used. In an example embodiment, the wireless protocol may be a radio frequency (RF) transmission. In one implementation, the range of the RF may be at least 50 meters. In another implementation, the range of the RF may be at least 100 meters. In still another implementation, the range of the RF may be at least 200 meters.

Figure 2:
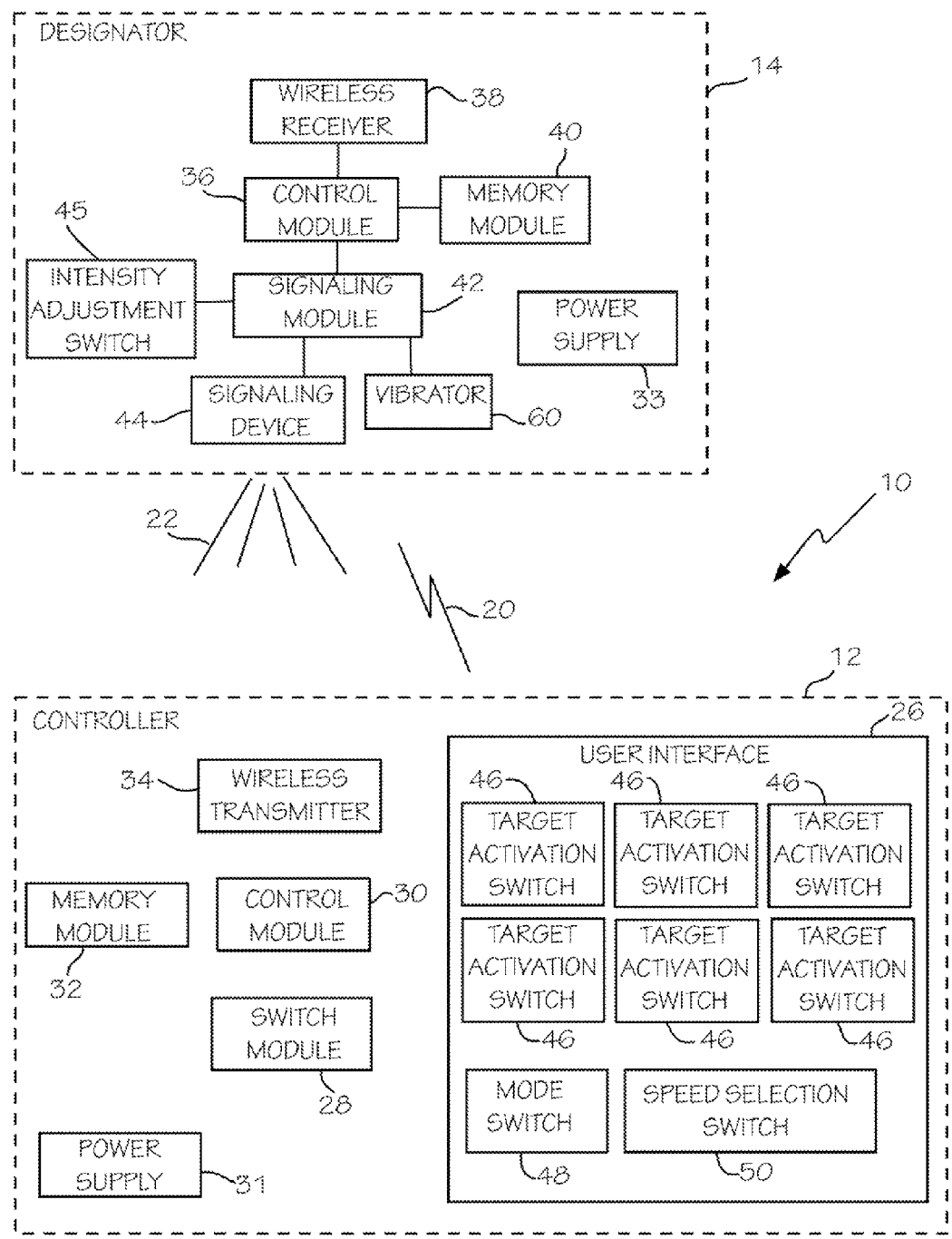
FIG. 2 is a schematic representation of the disclosed target recognition system.

Referring to FIG. 2, the controller 12 may include a power supply 31, a user interface 26, a switch module 28, a control module 30, a memory module 32 and a wireless transmitter 34. Each of the plurality of designators 14 (only one designator 14 is shown for clarity) may include a power supply 33, a control module 36, a wireless receiver 38, a memory module 40, a signaling module 42 and a signaling device 44.

In general, the word "module," as used herein, refers to logic embodied in hardware or firmware, or to a collection of software instructions, written in a programming language. One or more software instructions in the modules may be embedded in firmware, such as an EPROM. It can be appreciated that modules may include connected logic units, such as gates and flip-flops, and may include programmable units, such as programmable gate arrays or processors. The modules described herein may be implemented as either software and/or hardware modules and may be stored in any type of computer-readable medium or other computer storage device.

The actuation signal 20 may correspond to and communicate with a selected one (i.e., the selected designator 14') of the plurality of paired or synced designators 14. The wireless transmitter 34 may be any radio frequency (RF) emitting device suitable to transmit the actuation signal 20. Upon reception of the actuation signal 20 by the wireless receiver 38, the signaling module 42 may actuate the signaling device 44 to identify the designated target 18' by the target identifier 22.

In one embodiment, the controller 12 may be preprogrammed to communicate with the plurality of designators 14. For example, the actuation signal 20 may include a trigger code associated with each of the plurality of designators 14. The controller 12 may include a plurality of preset trigger codes, each preset trigger code corresponding to a unique identifying code of each designator 14. In another example, the controller 12 may transmit a signal on a specified wavelength corresponding to a particular wavelength of the wireless receiver 38.

In another embodiment, the controller 12 may be paired with any number of the plurality of designators 14. Pairing may allow any of the designators 14 to be disconnected (e.g., unpaired) from wireless communication with the controller 12 and different designators 14 to be wirelessly connected (e.g., paired) to the controller 12 at any time.

In one implementation, the controller 12 may include a plurality of digital trigger codes stored in the memory module 32. Each of the trigger codes may be matched with an internal identifying code of each designator 14 through a wireless pairing process. In one expression, the unique identifying code of each designator 14 may be matched with a digital trigger code and stored in the memory module 32 of the controller 12, which is accessible by the control module 30 of the controller 12. In another expression, the unique digital trigger code may be stored in the memory module 40 of a correspondingly paired designator 14, which is accessible by the control module 36 of the designator 14.

For example, the controller 12 and each designator 14 may include a push-button pairing switch where each designator 14 may be automatically paired with the controller 12. In another example, the user interface 26 of the controller 12 may include a key module (e.g., virtual keyboard or physical keyboard) where a pairing code of each designator 14 may be entered to pair each designator 14 with the controller 12. In another example, the controller 12 and/or the designators 14 may include switches (e.g., DIP switches) to allow programming of the trigger codes and/or the receiving codes, such that the codes of the designators 14 and the controller 12 may be matched. In yet another example, the controller 12 may use radio frequency identification (RFID) to convey the trigger code and program the designators 14. In still another example, each designator 14 may be physically connected (e.g., by a wired connection) to convey a trigger code and program the designators 14.

The controller 12 may be any suitably remote control device. For example, the controller 12 may be a hand held device (e.g., a remote control, a tablet computer, a smart phone, a personal computer or the like) including a housing and the user interface 26. The user interface 26 may include a plurality of target activation switches 46, one or more mode switches 48, and one or more speed selection switches 50. The controller 12 may also include a power switch and a pairing switch (not shown).

Each of the plurality of target activation switches 46 may correspond to an associated (e.g., paired) one of the plurality of designators 14. Each of the target activation switches 46 may output a trigger signal that initiates the transmission of the actuation signal 20. The trigger signal may define an actuation signal 20 that corresponds to and communicates only with the selected designator 14'. For example, as described above, the actuation signal 20 may include a trigger code that is associated with an identification code of the paired designator 14.

The speed selection switch 50 may control a duration of time the signaling device 44 of the selected designator 14' is activated or the duration of time between actuation of signaling devices 44 of different designators 14 (e.g., alternating between different selected designators 14) or both the duration of time the signaling device 44 of the selected designator 14' is activated and the duration of time between actuation of signaling devices 44 of different designators 14.

The controller 12 may include at least two modes of operation, including a manual mode and an automatic mode. The mode switch 48 may control the mode of operation. In manual mode, a trainer (e.g., a coach) may manually operate the controller through interaction with the user interface 26 to engage, or otherwise actuate, a selected target activation switch 46 corresponding to the designated target 18', in order to transmit the actuation signal 20 to actuate the selected designator 14' (FIG. 1) at a time initiated by the trainer. In automatic mode, the controller 12 may select a designated target 18' and actuate the selected designator 14' and/or alternate between designators 14. In automatic mode, the controller 12 may randomly select a designator 14 or may be preprogrammed to actuate the selected designator 14 at a preselected time or for a preselected interval.

In an example implementation of the manual mode, the trainer may actuate a selected one of the target activation switches 46 corresponding to the selected designator 14' of the designated target 18'. The switch module 28 may receive the trigger signal from the selected target activation switch 46 and may output a first control signal. The first control signal may be encoded with the trigger code associated with the selected target activation switch 46. The control module 30 may receive the first control signal and may match the trigger code with the identifying code of a corresponding designator 14 and output a second control signal. The second control signal may be received by the wireless transmitter 34 to emit the actuating signal 20 corresponding to the selected designator 14'. Transmission of the actuation signal 20 may continue until disengagement of the target activation switch 46, thus keeping the signaling device 44 activated. For example, when pressed, the actuation signal 20 may transmit continuously until the target activation switch 46 is released. As another example, when the target activation switch 46 is pressed, the actuation signal 20 may transmit until the target activation switch 46 is pressed again. Alternatively, transmission of the actuation signal 20 may continue for a preselected duration of time, as determined by the speed selection switch 50, thus keeping the signaling device 44 activated for the preselected duration of time. It can be appreciated that other implementations of transmission of the actuation signal 20 in response to actuation of target activation switches 46 are also contemplated.

In an example implementation of the automatic mode, the switch module 28 may output a series of first control signals. The first control signals may be transmitted randomly or according to a preprogrammed pattern or sequence. The control module 30 may receive each of the first control signals and may match the trigger code with the identifying code of a corresponding designator 14 and output a second control signal. The second control signal may be received by the wireless transmitter 34 to emit the actuating signal 20 corresponding to the specified designator 14'. Transmission of the actuation signal 20 may continue for a preselected duration of time as determined by the speed selection switch 50, thus keeping the signaling device 44 activated for the preselected duration of time. The speed selection switch 50 may also control the duration of time between the series of first control signals (i.e., the duration of time between actuation of different designators 14). It can be appreciated that other implementations of transmission of the actuation signal 20 in response to actuation of target activation switches 46 are also contemplated.

The wireless receiver 38 may be any suitable receiving device, such as an RF receiving device. The wireless receiver 38 may receive the actuation signal 20 emitted by the transmitter 34 and output a first control signal to the control module 36. The control module 36 may discriminate the first control signal according to the trigger code of the controller 12 stored in the memory module 40. After confirmation, a second control signal may be sent to the signaling module 42 to actuate the signaling device 44.

The signaling device 44 may provide the target identifier 22. In one implementation, the signaling device 44 may be one or a plurality of lights, such as light emitting diodes (LED), and the target identifier 22 may be visual, such as illumination. For example, the lights may be a single color LED. The lights of each of the designators 14 may normally be deactivated and upon reception of the actuation signal 20, the lights of the specified designator 14' may activate to identify the designated target 18' with illumination. Upon recognition of the illumination of the specified designator 14', the trainee 16 (FIG. 1) may pass the object 62 to the designated target 18'. The illumination (i.e., target identifier 22) may remain constant or may flash.

As another example, the lights may be multi-colored LEDs. The lights of each of the designators 14 may normally be activated in a first color (e.g., red) and upon reception of the actuation signal 20, the lights of the specified designator 14' may change to a second color (e.g., green) to identify the designated target 18' with a color-changed illumination. Upon recognition of the change in color of the illumination of the specified designator 14', the trainee 16 may pass the object to the designated target 18' (FIG. 1). The illumination (i.e., target identifier 22) may remain constant or may flash.

In another implementation, the signaling device 44 may be (or may include) a speaker, such as a piezoelectric speaker, and the target identifier 22 may be audible, such as a beep, tone or other sound. For example, the speakers of each of the designators 14 may normally be deactivated and upon reception of the actuation signal 20, the speaker of the specified designator 14' may activate to identify the designated target 18' with a sound. Upon recognition of the sound of the specified designator 14', the trainee 16 may pass the object 62 to the designated target 18'. The sound (i.e., target identifier 22) may remain constant or may pulse.

The signaling device 44 may be perceivable from a distance when activated. For example, the lights may be high intensity LEDs that are visible from a distance in day light conditions. As another example, the speaker may include sufficient power to be heard in a practice setting from a distance.

Each designator 14 may also include an intensity adjustment switch 45 configured to adjust the intensity of the signaling device 44 and thus, the target identifier 22. For example, the intensity adjustment switch 45 may be a multi-position switch (e.g., high intensity and low intensity) or a rotary switch to adjust the intensity (i.e., brightness) of the lights of the signaling device 44, such as for use between indoor conditions and outdoor conditions. In another example, the intensity adjustment switch 45 may adjust the intensity (i.e., volume) of the speakers of the signaling device 44.

Each designator 14 may also include vibrator 60 connected to the signaling module 42. The vibrator 60 may be any mechanical device that generates vibrations, for example a small electric motor with an unbalanced mass on its driveshaft. Upon reception of the actuation signal 20, the signaling module 42 may actuate the vibrator 60 concurrently with the signaling device 44 or immediately before the signaling device 44 to alert the target 18 of being the designated target 18'.

The designator 14 may also include at least one function switch (not shown) to switch the designator 14 between a plurality of functional modes. In a first example mode, the designator 14 may be de-energized and turned off. In a second example mode, the signaling device 44 may be deactivated until actuated by actuation signal 20. In a third example mode, the signaling device 44 and the vibrator 60 may be deactivated until actuated by actuation signal 20. In a fourth example mode, the signaling device 44 (e.g., a plurality of lights) may be energized and remain on continuously. In a fifth example mode, the signaling device 44 may be set to strobe (e.g., flashing lights) or pulse (e.g., intervals of sound from the speaker).

Figure 3:
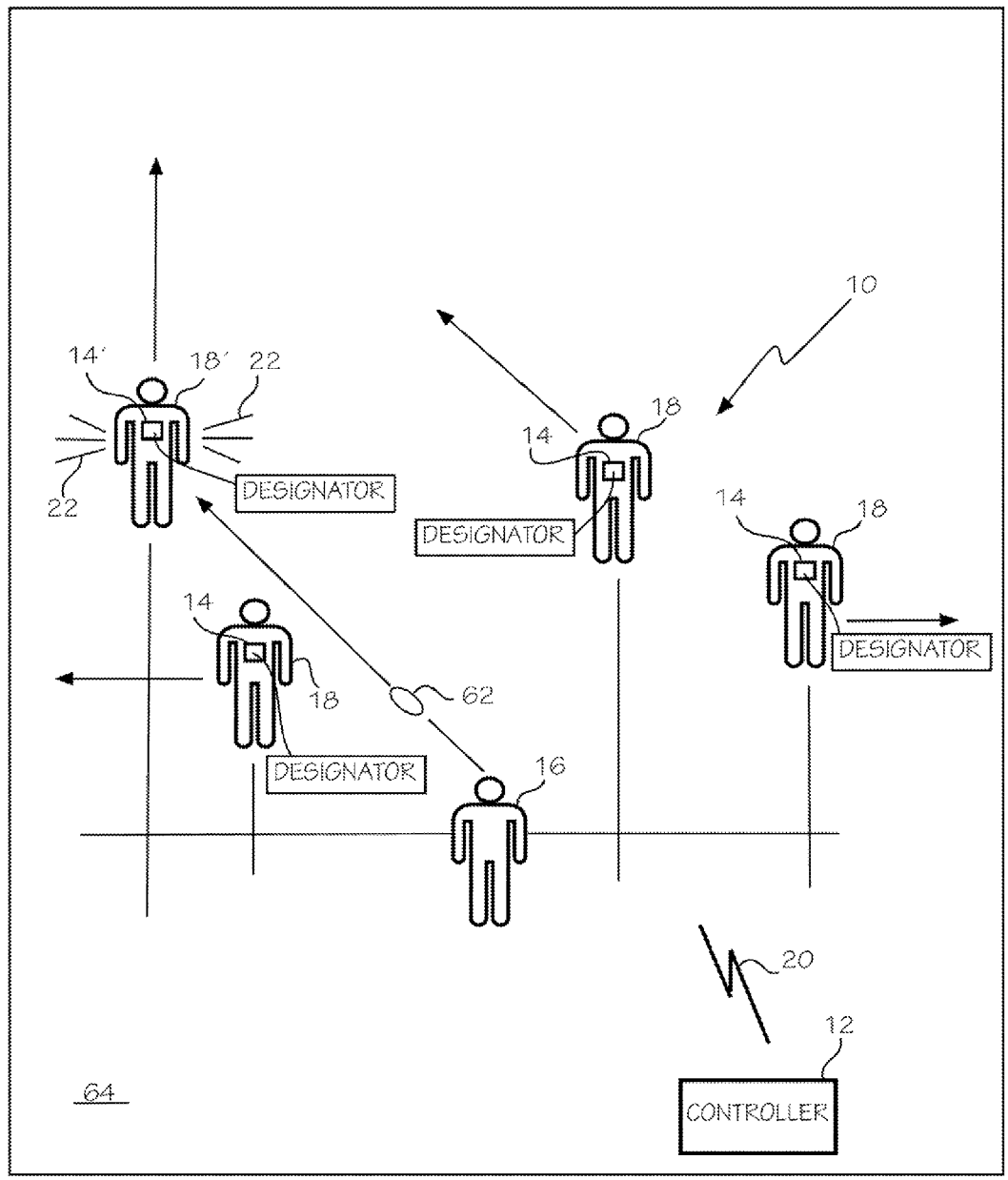
FIG. 3 is a schematic illustration of an example implementation of the disclosed target recognition system.

Referring to FIG. 3, an example implementation of the disclosed system 10 may include a football practice session. The trainee 16 (e.g., a quarterback) may be positioned behind a line of scrimmage and the targets 18 (e.g., receivers) may run passing routes. The actuation signal 20 may be provided to indicate that the designated target 18' is open (i.e., free from a defender) or is at an appropriate location along the passing route to receive the object 62 (e.g., a football).

Figure 4:
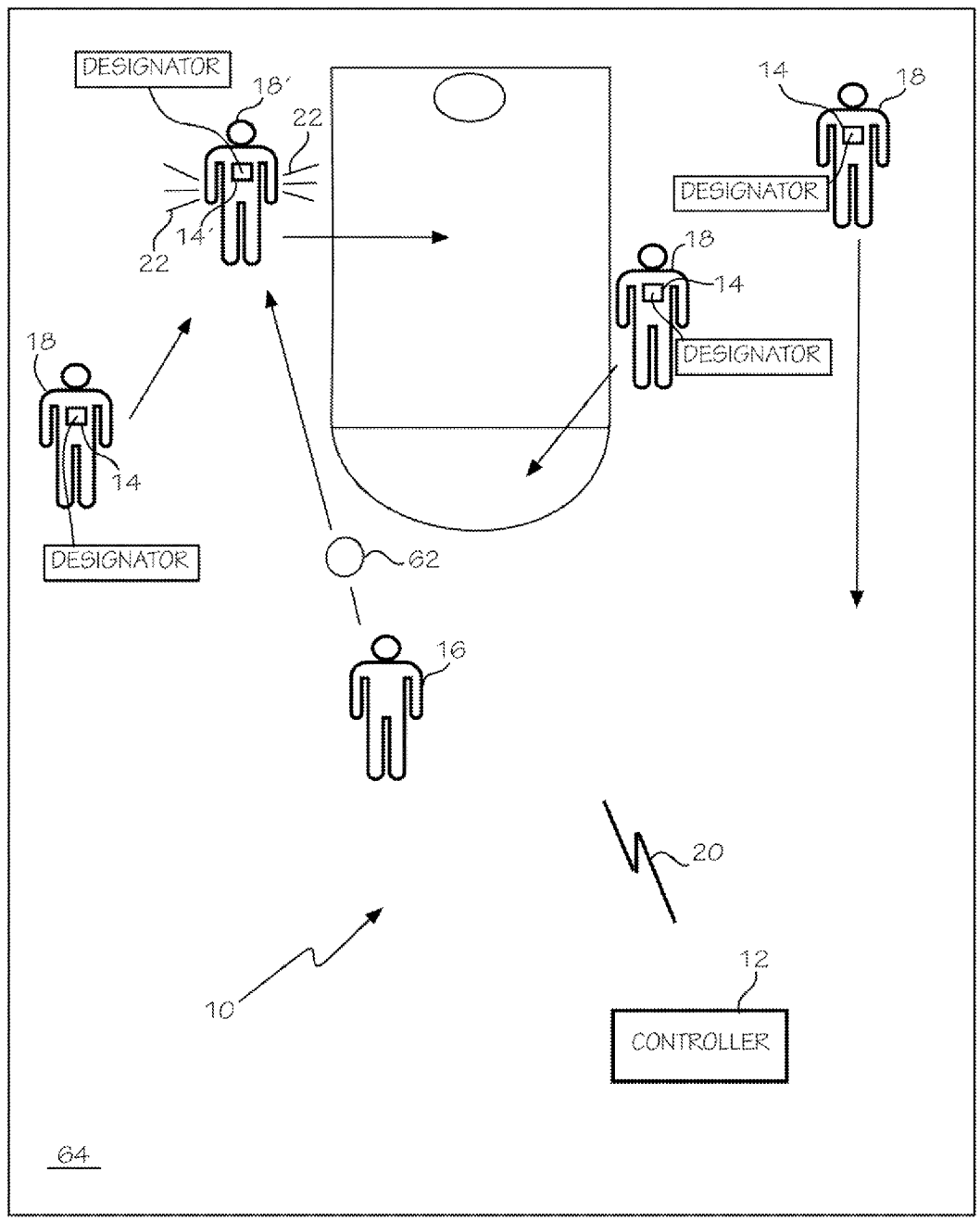
FIG. 4 is a schematic illustration of another example implementation of the disclosed target recognition system.

Referring to FIG. 4, another example implementation of the disclosed system 10 may include a basketball practice session. The trainee 16 (e.g., a point guard) may be positioned, for example at a top of the key, and the targets 18 (e.g., forwards, a center, and shooting guard) may be positioned around the basket and run a set play configuration. The actuation signal 20 may be provided to indicate that the designated target 18' is open (i.e., free from a defender) or is at an appropriate location for scoring.

Figure 5:
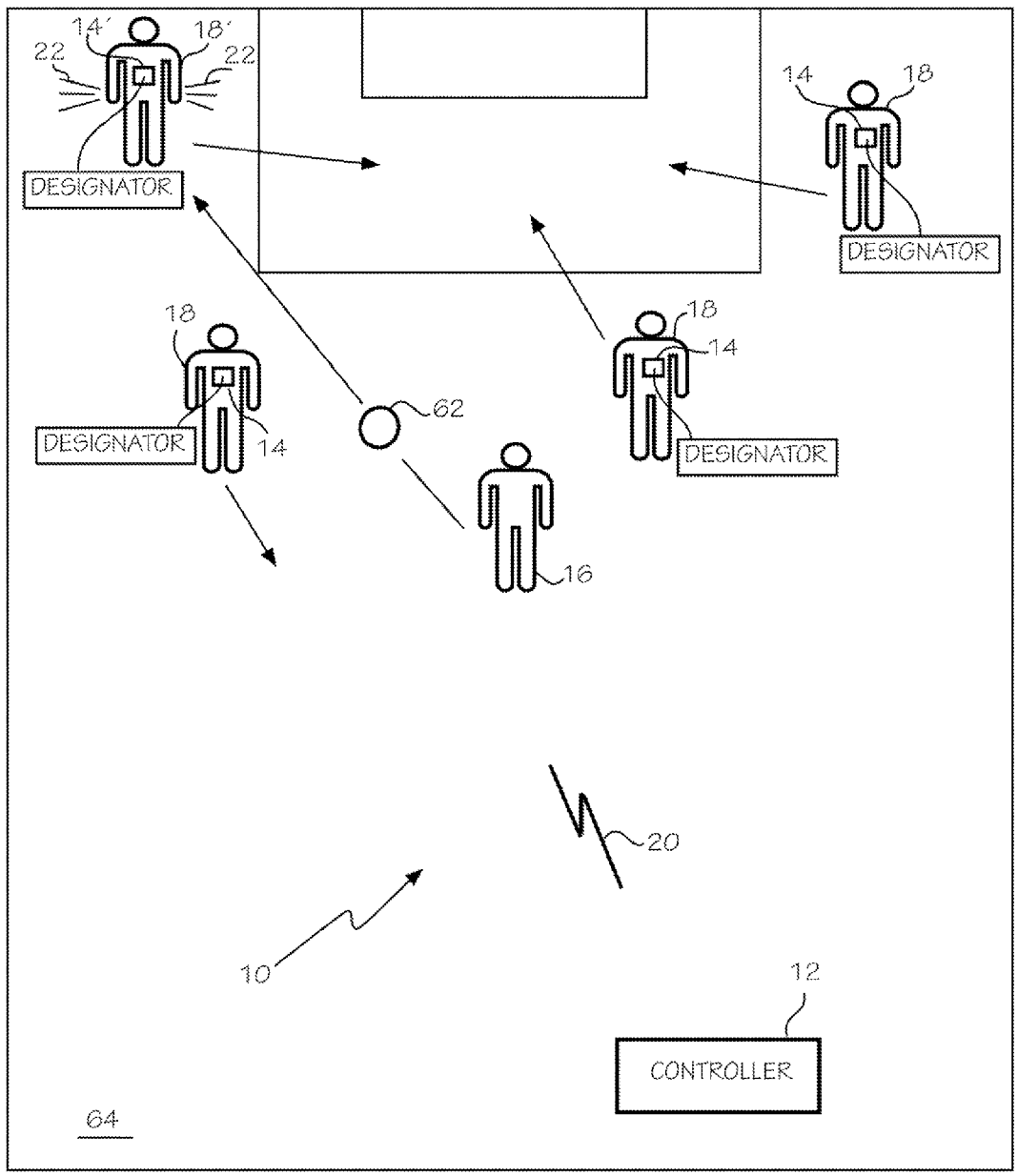
FIG. 5 is a schematic illustration of another example implementation of the disclosed target recognition system.

Referring to FIG. 5, another example implementation of the disclosed system 10 may include a soccer or hockey practice session. The trainee 16 (e.g., a forward or a wing) may be positioned at the top of the goal box and the targets 18 (e.g., forwards and midfielders) may be positioned around the goal and run a set play configuration. The actuation signal 20 may be provided to indicate that the designated target 18' is open (i.e., free from a defender) or is at an appropriate location for scoring.

Figure 6:
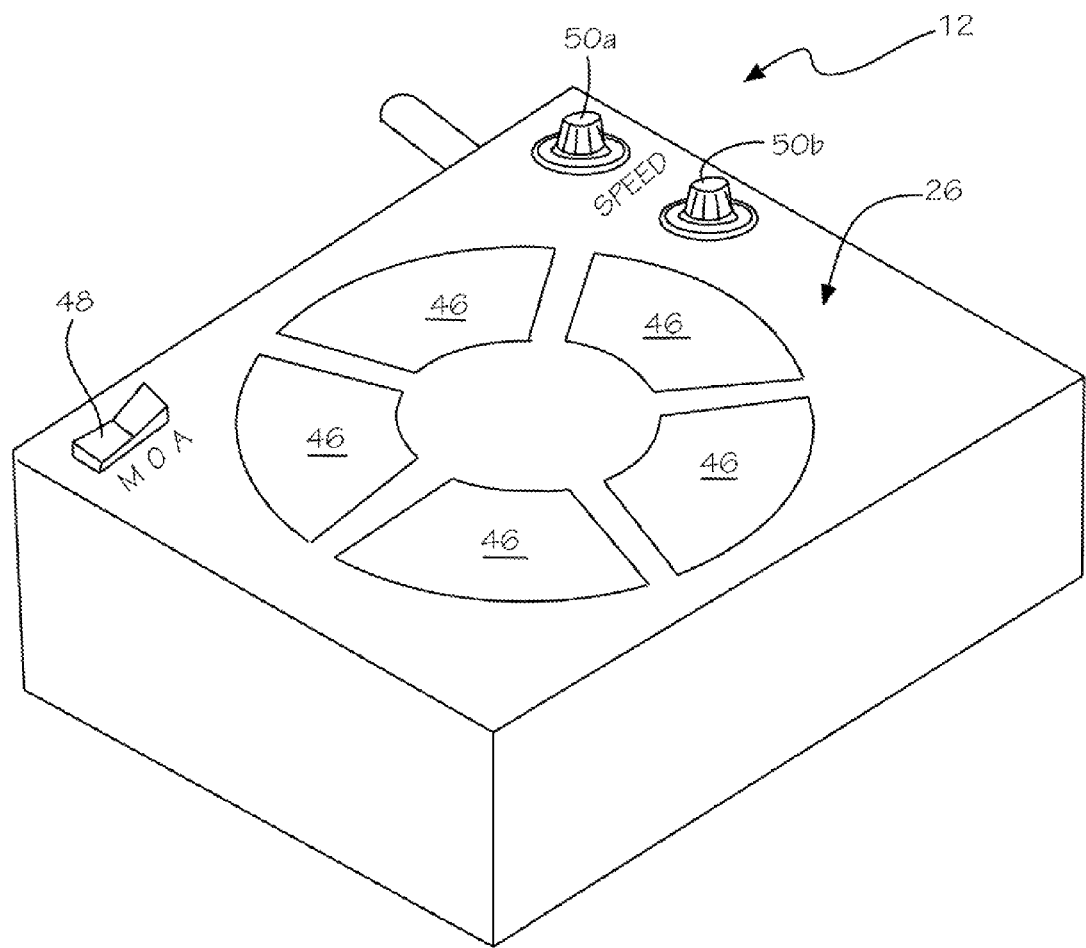
FIG. 6 is an example embodiment of a controller of the disclosed target recognition system.

Referring to FIG. 6, one embodiment of the controller 12 may be a remote control device having a housing and a physical user interface 26, for example having buttons, switches, and knobs. Each of the target activation switches 46 may include two-position push-button switch, each switch corresponding to a designator 14 (FIG. 1). The controller 12 may include any number of target activation switches 46 in any orientation or configuration upon the user interface 26. Five large push-button switches in a radial pattern around the center of the user interface 26 are illustrated by example.

Each of the target activation switches 46 may include a transparent or translucent lens cover. Each of the lens covers may include a different color corresponding to a base color of the paired designator 14. Each of the target activation switches 46 may also include an internal light (e.g., an LED), which may be actuated when the button in pressed in order to provide visual affirmation that the actuation signal 20 is being transmitted.

The mode switch 48 may be a two-position switch to switch between manual mode and automatic mode. Alternatively, the mode switch 48 may be a three-position switch that also incorporates the power switch to turn the controller off. A first speed selection switch 50a may include a rotary knob or dial switch to select the duration of time the signaling device 44 of the selected designator 14' is activated and a second speed switch 50b to select the duration of time between actuation of signaling devices 44 of different designators 14.

Figure 7:
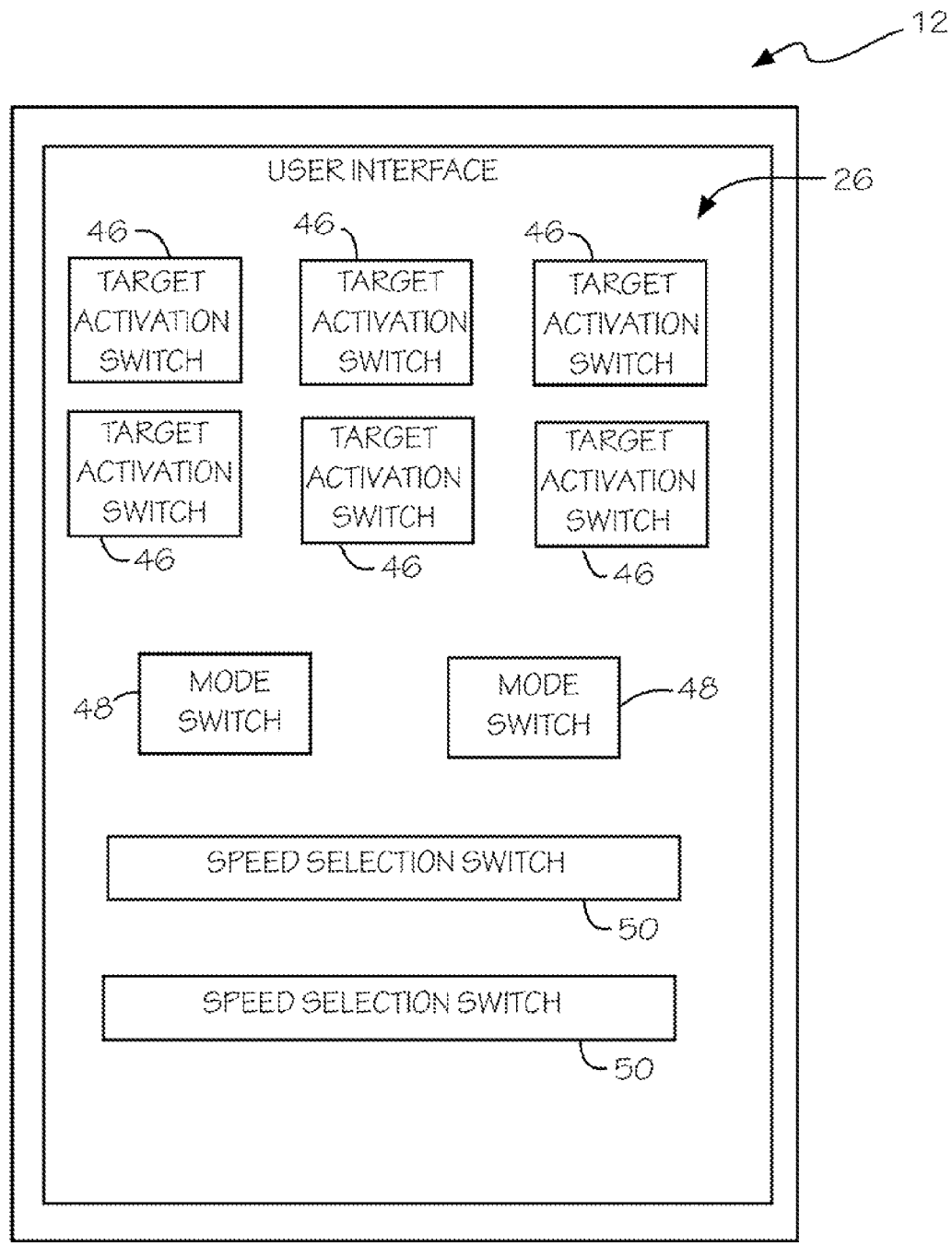
FIG. 7 is another example embodiment of a controller of the disclosed target recognition system.

Referring to FIG. 7, another embodiment of the controller 12 may be a remote control device, such as a smartphone, tablet (e.g., iPad) or PDA, having a housing and a touch screen user interface 26 providing a graphical interface. Each of the target activation switches 46, mode switch 48, and speed selection switch 50 may include an interactive icon arranged on a touch screen. Each of the target activation icons may correspond to a designator 14 (FIG. 1). The controller 12 may include any number of target activation switches 46 in any orientation or configuration upon the user interface 26. Six icons in a column and row pattern are illustrated by example.

Each of the target activation switches 46 may include a different color corresponding to a base color of the paired designator 14. Each of the target activation switches 46 may be highlighted or enlarge when actuated in order to provide visual affirmation that the actuation signal 20 is being transmitted.

The mode switch 48 may include two mode switch icons to switch between manual mode and automatic mode. The speed selection switch 50 may include two slidable speed selection icons to select the duration of time the signaling device 44 of the selected designator 14' is activated and the duration of time between actuation of signaling devices 44 of different designators 14.

Another embodiment of the controller 12 may be a personal computer having a software program designed to actuate the designators 14 (FIG. 1) based on user defined input criteria. The controller 12 may communicate with a web server or a local network to communicate with the designators 14, for example through a Wi-Fi network.

Figure 8:
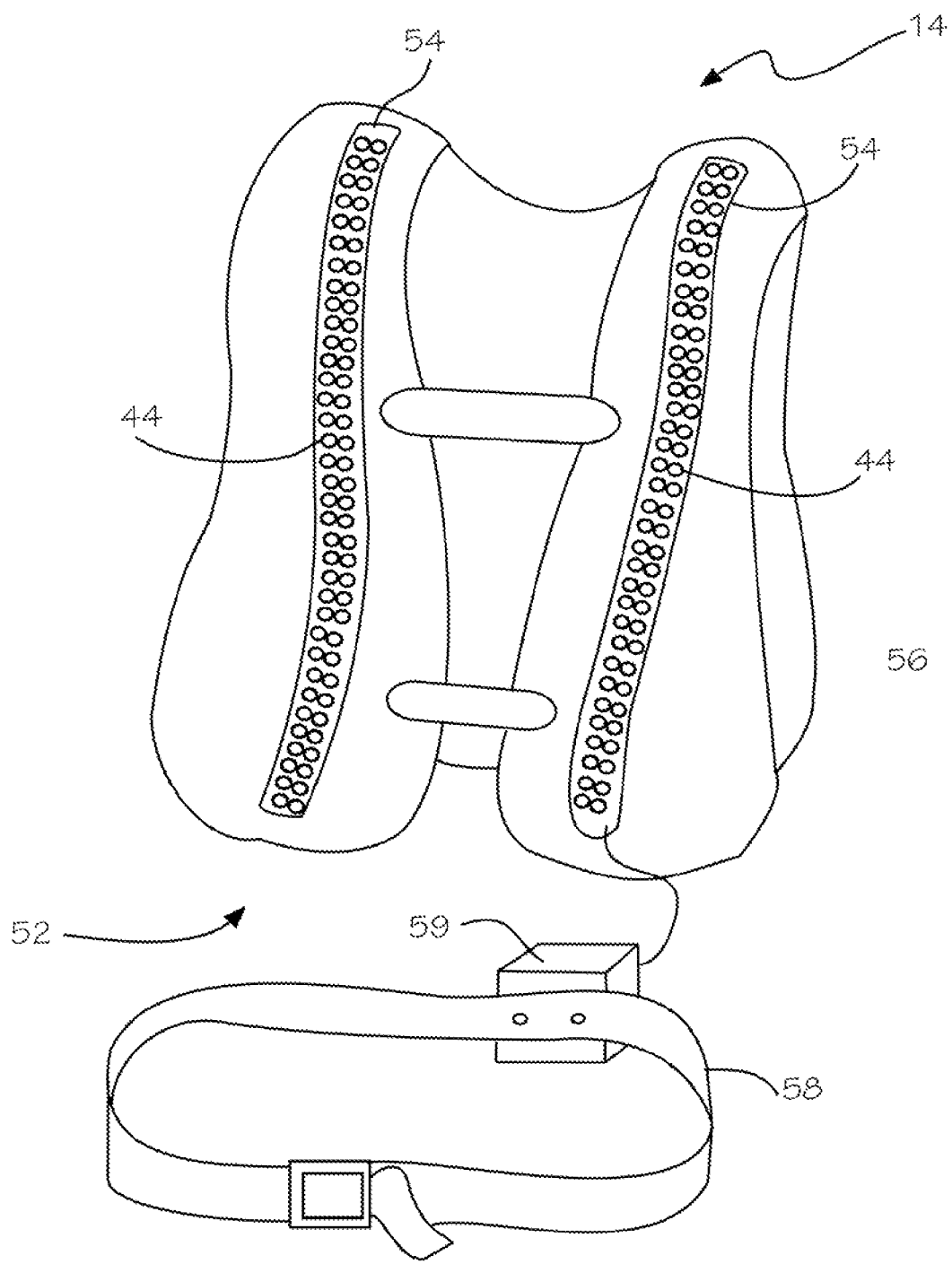
FIG. 8 is an example embodiment of a designator of the disclosed target recognition system.

Referring to FIG. 8, in one embodiment, each of the plurality of designators 14 may include a harness 52 that is wearable by the target 18 and a substrate 54 to which the signaling device 44 may be mounted. For example, the harness 52 may include a combination of a vest 56 and belt 58. The belt 58 may include a housing 59 enclosing the power supply 33, the control module 36, the wireless receiver 38, the memory module 40, and the signaling module 42 (FIG. 2). The substrate 54 may be attached or otherwise connected to the vest 56. The signaling device 44 may be mounted to the substrate 54 and electrically connected to the housing 59 mounted on the belt 58. It can be appreciated that in the illustrated example embodiment, the signaling device 44 includes a plurality of lights (e.g., LEDs) embedded throughout the substrate 54. The substrate 54 with the connected signaling device 44 may be positioned on a front side, a rear side, or on both sides of the vest 52. The signaling device 44 may have any configuration or layout upon the substrate 54.

In another embodiment, the substrate 54 may be mounted to or connected to a one-piece wearable harness 52. For example, the power supply 33, the control module 36, the wireless receiver 38, the memory module 40, and the signaling module 42 may be attached to the vest 56 and the signaling device 44 may be attached to the substrate 54, which is also attached to the vest 56. The power supply 33, the control module 36, the wireless receiver 38, the memory module 40, and the signaling module 42 may be attached (e.g., by a removably attached enclosure) to the harness 52 or may be connected (e.g., integrally) to the harness 52.

In another embodiment, the substrate 54 may be insertably attached within a transparent pocket or sleeve on the harness 52. In still another embodiment, the designator 14 may be a unitary body that may be insertably attached within a transparent pocket or sleeve on the harness 52.

It can be appreciated that the harness 52 may be any wearable item or piece of apparel, including a helmet, a jersey (or any other type of garment), an armband, a headband, or the like. No matter the form the harness 52 may take, the substrate 54 with connected signaling device 44 may be attached to or integral with the harness 52. The substrate 54 with the connected signaling device 44 may be positioned in various configurations to cover part of or the entire harness 52.

The mode switch (not shown) and the intensity adjustment switch 45 (FIG. 2) of each designator 14 may be located on an exterior of the housing 59. It is also contemplated that the housing 59 may include a touch screen interface having a mode switch icon and an intensity adjustment switch icon.

The power supply 31, 33 of the controller 12 and the designators 14 may be any suitable direct current electrochemical cell, such as a removable rechargeable battery, a removable disposable battery, an internal rechargeable battery, or the like. Alternatively, the power supply 31, 33 may be a solar cell. Alternatively still, the power supply 31 of the controller 12 may be any suitable alternating current power supply.

The system 10 may also include a portable recharging station (not shown). The recharging station may be electrically connected to the controller 12 and/or the plurality of designators 14 to recharge the rechargeable batteries. The charging station may be configured to electrically connect directly to an alternating current power source (e.g., 120V AC outlet) or may connect to a direct current power source (e.g., a 12V DC vehicle outlet). The recharging station may also include a plurality of LED indicators associated with each charging port to indicate the charging status of the connected controller 12 and/or the designators 14.

Figure 9:
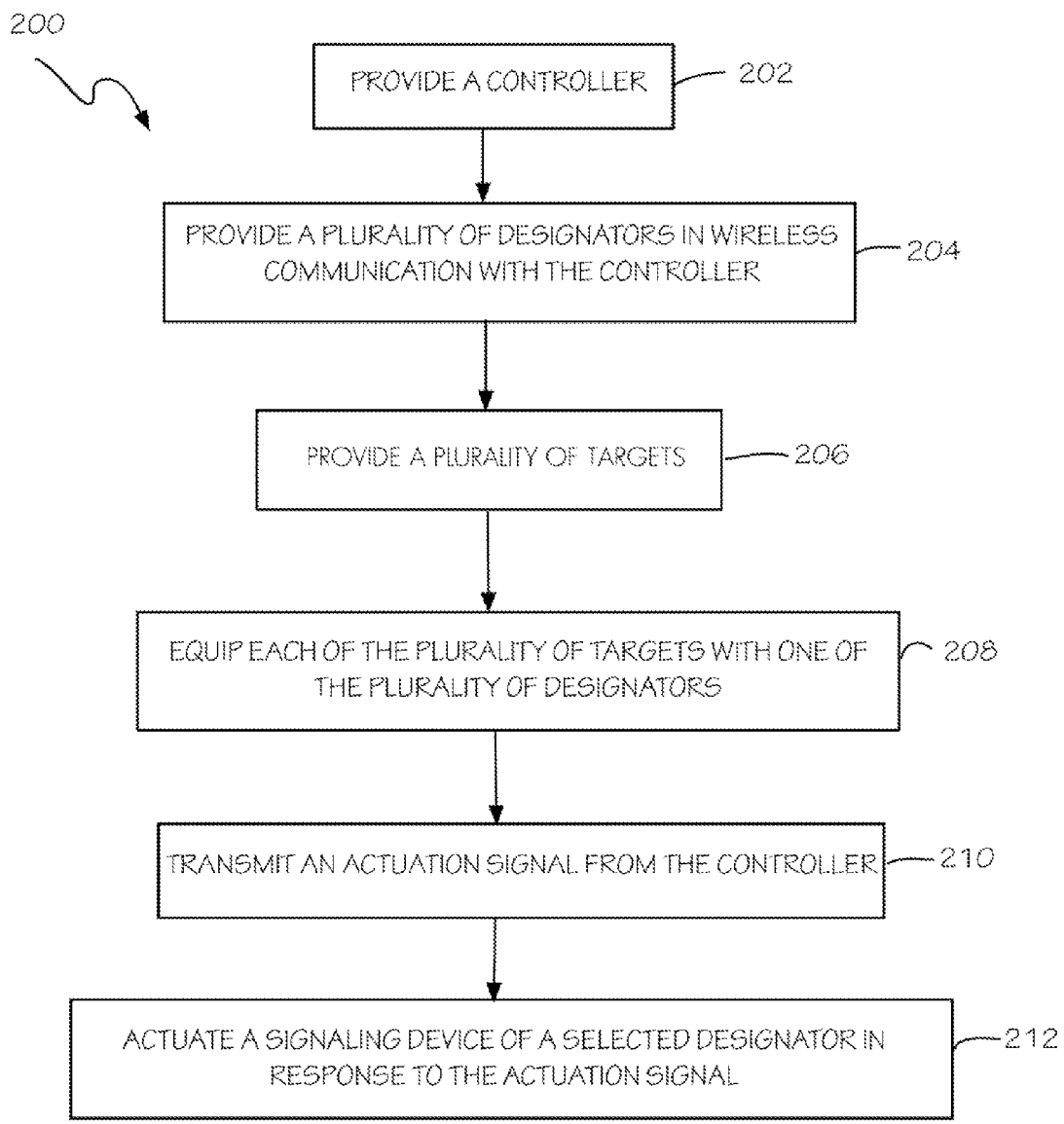
FIG. 9 is a flow chart illustrating an embodiment of the disclosed method for target recognition training.

Referring to FIG. 9, also disclosed is a method, generally designated 200, for target recognition training utilizing the disclosed target recognition system 10. The method 200 may begin at block 202 with providing a controller configured to transmit an actuation signal. As shown at block 204, a plurality of designators in wireless communication with the controller may be provided. Each designator may include a signaling device. The designators may be paired with the controller to communicate with the controller. For example, each designator may be paired with an individual target activation switch of the controller through a wireless pairing or wired syncing process. Alternatively, designators may be pre-programmed to communicate with the controller.

As shown at block 206, a plurality of targets may be provided. The targets may be, for example, a plurality of offensive players.

As shown at block 208, each target may be equipped with one of the designators. For example, each target may be equipped with a designator to train or practice for a sport in which an offensive player may pass an object to another offensive player. A trainee may be given possession of the object and a plurality of targets may be spread out to receive the object.

As shown at block 210, the controller may transmit the actuation signal corresponding to a selected designator. The actuation signal may be selectably associated with the selected designator of the plurality of designators.

As shown at block 212 the signaling device of the selected designator may be actuated in response to the actuation signal to indicate a designated target.

Accordingly, the disclosed target recognition system and method may allow a trainee to develop the ability to quickly survey an area and improve decision-making and reaction skills in response to recognition of a target. The disclosed system may be particularly beneficial in the simulation of game conditions of multi-player sports that involve the passing of an object towards a target, thereby allowing a minimal number of participants (e.g., only offensive players) to train in a realistic environment.

Although various aspects of the disclosed target recognition system have been shown and described, modifications may occur to those skilled in the art upon reading the specification. The present application includes such modifications and is limited only by the scope of the claims.

What is claimed is:

1. A target recognition system comprising:
a controller configured to transmit an actuation signal; and
a plurality of designators in wireless communication with said controller to receive said actuation signal, each designator of said plurality of designators comprising a signaling device connected to a harness,
wherein said actuation signal is uniquely associated with at least one selected designator of said plurality of designators to actuate said signaling device of said selected designator.

2. The system of claim 1 wherein transmission of said actuation signal is initiated manually.

3. The system of claim 1 wherein said controller comprises:
a user interface providing a user input to select said actuation signal associated with said selected designator;
a control module connected to said user interface; and
a wireless transmitter connected to said control module to transmit said actuation signal.

4. The system of claim 1 wherein said controller comprises a plurality of target activation switches, each target activation switch of said plurality of target activation switches being associated with a corresponding designator of said plurality of designators.

5. The system of claim 4 wherein transmission of said actuation signal associated with said selected designator is initiated by said target activation switch.

6. The system of claim 4 wherein said corresponding designator of said plurality of designators is wirelessly paired with a corresponding target activation switch of said plurality of target activation switches.

7. The system of claim 1 wherein transmission of said actuation signal is initiated automatically by said controller.

8. The system of claim 1 wherein transmission of said actuation signal is initiated randomly by said controller.

9. The system of claim 1 wherein said controller comprises at least one speed selection switch, said speed selection switch being configured to define a duration of time for transmission of said actuation signal.

10. The system of claim 1 wherein said controller comprises at least one speed selection switch, said speed selection switch being configured to define a duration of time between transmissions of a plurality of actuation signals.

11. The system of claim 1 wherein each designator of said plurality of designators comprises:
a wireless receiver;
a control module connected to said wireless receiver; and
a signaling module connected to said control module to actuate said signaling device in response to reception of said actuation signal by said wireless receiver.

12. The system of claim 1 wherein said harness comprises a garment.

13. The system of claim 1 wherein said signaling device comprises at least one of a light and a speaker.

14. The system of claim 1 wherein each designator of said plurality of designators comprises an intensity adjustment switch for controlling intensity of said signaling device.

15. The system of claim 1 wherein said signaling device comprises a plurality of light emitting diodes.

16. The system of claim 1 wherein each designator of said plurality of designators comprises a vibrator.

17. A method for target recognition training, said method comprising the steps of:
providing a controller configured to transmit an actuation signal;
providing a plurality of designators in wireless communication with said controller, each designator of said plurality of designators comprising a signaling device;
providing a plurality of targets;
equipping each of said plurality of targets with a designator of said plurality of designators;
transmitting said actuation signal from said controller, said actuation signal being uniquely associated with a selected designator of said plurality of designators; and
actuating said signaling device of said selected designator in response to said actuation signal.

18. The method of claim 17 further comprising initiating, by said controller, said actuation signal associated with said selected designator, wherein initiating said actuation signal associated with said selected designator comprises at least one of a manual initiation or an automatic initiation.

19. The method of claim 18 wherein said automatic initiation of said actuation signal associated with said selected designator is randomly initiated by said controller.

20. The system of claim 1 wherein said controller is configured to transmit a plurality of actuation signals, and wherein each actuation signal of said plurality of actuation signals is uniquely associated with a corresponding designator of said plurality of designators.

\* \* \* \* \*